United States Patent [19]

Michele et al.

[11] Patent Number: 4,478,719

[45] Date of Patent: Oct. 23, 1984

[54] METHOD AND APPARATUS FOR THE SEPARATION OF FLUIDS BY PERMEATION

[76] Inventors: Helmut Michele, Auf dem Schnee 2c, 5804 Herdecke; Günter Schulz, Rosental 38-40, 4600 Dortmund 1; Udo Werner, Halerner Strasse 67, 4350 Recklinghausen, all of Fed. Rep. of Germany

[21] Appl. No.: 208,335

[22] Filed: Nov. 19, 1980

[51] Int. Cl.³ .................... B01D 31/00; B01D 13/00
[52] U.S. Cl. ........................ 210/641; 55/16; 55/158; 210/195.2
[58] Field of Search ............. 55/16, 158; 210/195.2, 210/323.2, 321.1, 641

[56] References Cited

U.S. PATENT DOCUMENTS

| | | | |
|---|---|---|---|
| 2,923,749 | 2/1960 | Lee et al. | 210/641 X |
| 3,144,313 | 8/1964 | Pfefferle | 55/16 |
| 3,208,197 | 9/1965 | Simon et al. | 55/16 |
| 3,246,449 | 4/1966 | Stern et al. | 55/16 |
| 3,250,080 | 5/1966 | Garwin | 55/16 X |
| 3,654,148 | 4/1972 | Bradley | 210/321.1 X |
| 4,104,037 | 8/1978 | Garrett et al. | 55/16 |
| 4,119,417 | 10/1978 | Heki et al. | 55/158 |
| 4,119,418 | 10/1978 | Smid | 55/158 |

FOREIGN PATENT DOCUMENTS

| | | | |
|---|---|---|---|
| 52-3580 | 1/1977 | Japan | 210/641 |
| 53-115660 | 10/1978 | Japan | 210/641 |

Primary Examiner—Frank Spear
Attorney, Agent, or Firm—Spencer & Frank

[57] ABSTRACT

The separation of different components of a fluid, e.g. of He, $H_2$, $O_2$, or the like from gaseous mixtures, separation of saturated and unsaturated hydrocarbon, water separation from organic mixtures, waste water purification etc., is effected by passing the treated fluid over a row of permeation cells each formed by a container subdivided, by a wall more readily permeable by one component of the fluid, into an inlet chamber and a permeate chamber. The respective chambers are arranged in series directed opposite to each other and the respective products are withdrawn at the respective ends of the series. A part of the product of the permeate chamber series is fed back into the inlet chamber series. Preferably, the delivery of untreated fluid into the inlet chamber series is effected at a point selected such as to obtain the smallest possible difference in the concentration of a respective component in the incoming untreated fluid and in the fluid being circulated through the system. A number of combinations of the basic unit of the method is disclosed. The invention results in reduced energy and permeable area requirements by limiting the volume of recirculated fluid and by strategic location of the inlet for untreated fluid.

15 Claims, 7 Drawing Figures

METHOD AND APPARATUS FOR THE SEPARATION OF FLUIDS BY PERMEATION

BACKGROUND OF THE INVENTION

The invention relates to a method and apparatus for separation of fluids by permeation in at least one permeation stage or cell provided with a wall which is differently permeable by such fluids or by their components, and which stage is subdivided by the wall into an inlet portion and a permeate portion, wherein the fluid is charged to that side of the membrane which is associated with the infeed portion and the less strongly permeating component is withdrawn at such side, while the more strongly permeating component is withdrawn at the permeate side.

The fluids involved herewith can be in the form of liquids, gases, solutions or dispersions. As a permeable wall, a membrane is used from a suitable material, e.g. of the type of a plastic film. To the known applications of such method belongs e.g. the separation of helium from natural gas. A method of this type can also be used in the field of enrichment with oxygen, with uranium or the like. In another application, it is possible, under the use of the principle of reverse osmosis, to separate salt components from seawater for the purpose of producing fresh water. For this purpose, a relatively high energy consumption is required as pressure values of between 50 and 100 bar must be generated.

All installations thus far used for such separation are relatively expensive with regard to their structure. A number of permeation stages in the form of membrane modules are interconnected in a cascade fashion. Such cascade interconnections, however, have the drawback that the required exchange surfaces must be relatively large and that, also, the drive of such installations is very demanding on energy. The reason for this is, among other things, the necessity of circulating relatively large volumes of fluid, namely with a great number of feeding organs or fluid movers.

Proceeding from the above, it is an object of the invention to provide a method suitable for separation of fluids by permeation which can be carried out in technically less expensive devices and at smaller operation costs.

SUMMARY OF THE INVENTION

In general terms and in one aspect thereof, the present invention provides a method for the separation of a fluid by permeation in at least one permeation stage which is provided with a wall differently permeable by the fluid or by its components, said stage being divided by the wall into an inlet portion and a permeate portion, the fluid being charged to that surface of the wall which is coincident with the inlet portion, a less readily permeating component of the fluid being withdrawn from said inlet portion while a more readily permeating component of the fluid is removed from the permeate portion as a permeate, wherein the permeate withdrawn from the permeate portion is partly circulated over a feeding device to the inlet portion while the less readily permeating component is withdrawn from the inlet portion.

In another aspect of the present invention and still defining same in general terms, an apparatus is provided for separation of fluids by permeation, of the type comprising, in combination: inlet chamber means communicating with inlet means for a fluid containing two components to be separated; partition means whose one surface forms a part of wall means of said inlet chamber and means made of a material more readily permeable by one of said components and less readily permeable by the other of said components; the other surface of the partition means forming a part of wall means of permeate chamber means; first discharge means communicating with said inlet chamber means and adapted to remove therefrom a portion of the fluid depleted in said one of said components; second discharge means communicating with said permeate chamber means for removal therefrom of a portion of the fluid enriched in said one of said components; circulation means including fluid mover means and communicating said permeate chamber means with said inlet chamber means for return of a portion of the fluid enriched in said one of said components from said permeate chamber means to said inlet chamber means.

In another aspect of the apparatus of the present invention and still referring to same in general terms, an apparatus is provided for separation of at least two components of a fluid from each other, comprising, in combination: a plurality of permeation cells disposed one after the other and comprising a first cell and a last cell; each cell comprising a container subdivided by a permeable wall into an inlet chamber and permeate chamber, said wall being of a predetermined permeability with respect to said at least two components; said inlet chambers being interconnected in series for fluid passage in a direction from said first cell to said last cell; said permeate chambers being interconnected in series for fluid passage in a direction from said last cell to said first cell; first discharge means for discharging fluid from the permeate chamber of the first cell; second discharge means for discharging fluid from the inlet chamber of the last cell; feeding means communicating with said series of the inlet chambers for feeding untreated fluid into said series of the inlet chambers at a predetermined location thereof; feedback means including fluid mover means and communicating the permeate chamber of the first cell with said series of the inlet chambers for feeding a part of the fluid from the permeate chamber to a predetermined location of said series.

Thus, in this method and apparatus, a concentration drops develops inside a permeation stage along the permeable wall such that the concentration in the permeate portion of the faster permeating components at one end of the wall is greater than at the other end of the wall. Therefore, the faster permeating component can be withdrawn from the permeate portion at this end of the wall at a relatively high concentration and can be partly charged back into the inlet portion for the continuing separation process, while another part of the withdrawn fluid is removed as an end product or an intermediate product for further separation steps.

The not so well permeating component of the fluid is withdrawn at the opposite end of the wall from the infeed portion and is also subjected to further separation treatments as a second end product or as an intermediate product.

The length of the permeable wall between the two end regions can be arbitrary and is determined in dependence on operational requirements.

The inventive method and apparatus is basically applicable also for the production of more than two end products or intermediate products as well as for more than two fluids or fluid components, each of a different concentration.

By the use of the inventive method, the costs required for the separation of fluids can be considerably reduced. For achieving predetermined separation performances, considerably smaller exchange surfaces are sufficient. Therefore, a correspondingly simplified structure of the apparatus results. Particularly in comparison with the known cascade installations, a smaller feeding capacity is necessary which leads to a correspondingly less rugged structure of the individual feeding organs and/or to a smaller number of same. A considerable saving in energy is achieved as well by the fact that in order to obtain the desired separation performance, smaller fluid volumes need to be conveyed.

In the following, several preferred embodiments of the invention will be described, of which particularly advantageous are those wherein a number of permeation stages is provided in which the inlet portions or chambers and the permeate portions or chambers are each connected one after the other. The respective required size of the exchange surfaces can thus be divided into different permeation stages which are connected in the proposed way.

Furthermore, it is proposed by the invention that the fluid between the inlet portions connected in series be charged to a location at which the concentration of the circulated fluid generally corresponds to the concentration of the charged untreated fluid components.

Referring respectively to a given separation rating, a further reduction is thus achieved of the fluid volume to be circulated. Also, the size of the required wall or exchange surfaces is further reduced. This is possible because, by the particular choice of the inlet point, the concentration within the device is distorted as little as possible.

It is further of advantage, in accordance with the invention, when two permeation stages are so connected with each other that the fluid flow which is not charged back into the inlet portion of the first permeation stage is directed to the inlet portion of the second permeation stage, while the fluid flow withdrawn from the inlet portion of the second permeation stage is charged back to the inlet portion of the first permeation stage.

By such doubling of the number of stages, admittedly, an additional fluid mover is generally required; however, this is more than compensated for by a substantially greater reduction of the fluid volume to be circulated. Also, the required exchange surface area is reduced.

A further advantageous embodiment of the method and apparatus of the invention resides in that two apparatus sections, each composed of a number of permeation stages connected in series, are so connected with each other that the fluid flow which is not charged back to the inlet portion of a permeation stage in the first section is charged back to an inlet portion of the second section disposed in a series, at a point at which the concentration of the circulated fluid generally corresponds to the concentration of the charged fluid components at the inlet portion of the said second section.

In so doing, firstly, the same advantages are achieved as have been described above for the use of the inventive method in merely a single apparatus section. Furthermore, in the two-section devices disposed in the described way, it is possible, if desired, to also withdraw, in a particularly advantageous way, a third product or an intermediate product at the end of the inlet portions of the second apparatus section arranged in series.

In this connection, it is further conceivable in accordance with the invention, that the fluid flow withdrawn from an inlet portion of the second apparatus section is charged back to an inlet portion of the first apparatus section connected in series with the former, at a point wherein the concentration of the circulated fluid in the inlet portions of the first apparatus section generally corresponds to the concentration of the components contained in the fluid flow.

A corresponding three- or more sectional arrangement of an apparatus, however, is also within the framework of the invention.

According to a further embodiment of the invention, the proposed method can also be carried out and the apparatus arranged such that the fluid flow withdrawn from the permeate portion of a first permeation stage is first charged back through the inlet portion of an additional stage and then into an inlet portion of the first permeation stage, and that the permeate is withdrawn from the permeate portion of the additional stage.

In such arrangement, the additional stage does not have to be so laid out as to provide along its permeable wall a drop in concentration. It has been found out that this arrangement of the inventive apparatus and method is particularly useful if especially high concentration values are to be achieved at least in an end product. These can be obtained in the described way with relatively very small exchange surfaces and low volume of the circulated fluid. It is conceivable with the arrangements associated with the inventive method or with the corresponding layout of the apparatus, that after achieving a given inlet concentration, a further increase in concentration achievable by such additional stage can be obtained by an exchange surface which is of a lesser size as compared with a further permeation stage connected correspondingly with the first permeation stage.

The final concentration can be increased in accordance with the invention by such a method or by a corresponding layout of the apparatus, in a further advantageous way, if the permeate portion of the auxiliary stage is connected with the infeed portion of a second auxiliary stage and if the end product is withdrawn from the permeate portion of the second auxiliary stage. Preferably, a further feeding organ is provided between the two auxiliary stages.

According to the invention, it is further possible to interconnect the apparatus sections utilizing an auxiliary stage such that the fluid flow withdrawn from the permeate portion of a first permeation stage or a first apparatus section is at least partly charged back over the inlet portion of an auxiliary stage into the inlet portion of the first permeation stage or into a first apparatus section, that the permeate obtained in the auxiliary stage is charged into the inlet portion of a second permeation stage or a second apparatus section, and that the component withdrawn from the last mentioned inlet section, which has a lesser capability to permeate, is charged into the inlet portion of the first permeation stage or of the first apparatus section. In so doing, the respective inlet locations in the series of inlet portions of an apparatus section can be so selected relative to the concentrations of the treated fluids and of the charged or withdrawn fluids, as has been described in connection with the method provisions referred to above. Further advantages are available, for certain applications of the proposed method, when the permeable walls of the respective permeation stages are provided with different permeability properties. In this context, it is further proposed in accordance with the invention that at least two permeation stages or apparatus sections be provided, each comprised of a number or permeation stages, and that the permeable walls comprised in the permeation stages or apparatus sections have different permeability features such that a stronger permeability is provided for each of the different components of the fluid. This can be implemented within the method proposed by the invention in a particularly suitable way, when two permeation stages or apparatus sections comprised of a number of permeation stages are provided with a first and a second permeability of the permeable walls such that for the respective different components of the fluid a stronger respective permeability is provided. The permeate portion of the permeation stage or of the apparatus section with the first permeability is then connected, over a fluid mover, with the infeed portion of the second permeation stage or of the second apparatus section having the second permeability. Also, in this embodiment, the permeate side of the second permeation stage or of the second apparatus section is maintained in connection, over a further fluid mover, with the inlet portion of the first permeation stage or of the first apparatus section. The respective product flows are withdrawn at the ends of the respective inlet portions or chambers.

This means, in other words, that within the framework of the carrying out of the proposed method in obtaining given concentration grades of the respective components of the fluid, a further increase in concentration can be obtained in the respective section whose permeable walls have the respective different permeability. Thus, it is also possible to obtain a considerable reduction in the respective fluid volume to be circulated.

BRIEF DESCRIPTION OF THE DRAWINGS

The invention will now be described in greater detail with reference to the accompanying drawings, wherein.

DETAILED DESCRIPTION OF PREFERRED EMBODIMENTS

In all drawings, the letter F designates the inlet for the fluid to be treated. The component of the fluid which permeates more readily or the corresponding end product is referred to with A, while B designates the component or a further end product permeating less readily.

Figure 1:
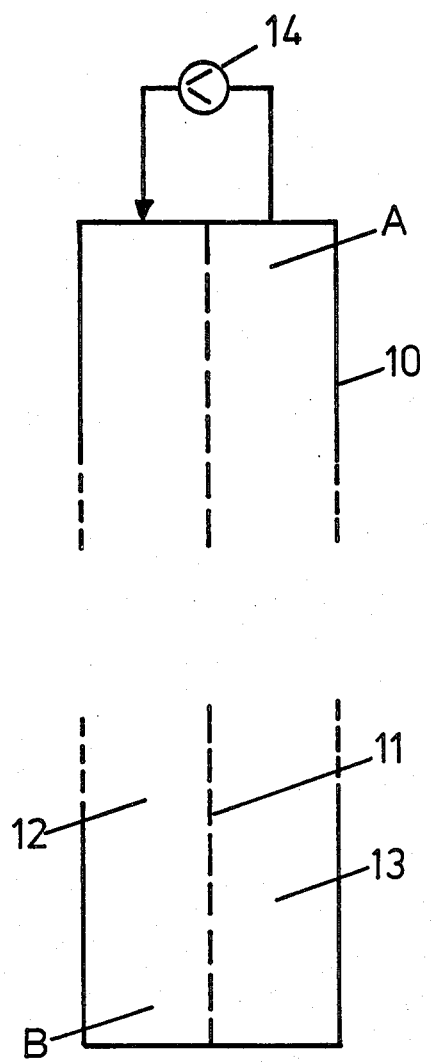
FIG. 1 is a diagrammatic representation explanatory of the basic features of a permeation stage or cell used in the present invention.

With reference to FIG. 1, the function of a permeation stage or cell 10 will be first described in general. A permeable or semipermeable wall or partition 11, subdivides the cell into an inlet portion or chamber 12 and a permeate portion or chamber 13. In the region of the upper end of the partition 11 in FIG. 1, the permeate, i.e. the component that passed through the wall or partition 11, is withdrawn by means of a fluid mover or pump 14 and is returned into the inlet chamber 12. During the course of circulation of the treated fluid contained in the permeation stage 10 and containining both components A and B, the following takes place:

A substantial volume of the more readily permeating component A passes through the wall 11 already at the upper region of the inlet chamber 12 of FIG. 1, so that the highest concentration in the component A will be obtained at the corresponding (i.e. upper) location of the permeate chamber 13. As the fluid proceeds to the lower end of the wall 11 in FIG. 1, the concentration in the component A within the inlet chamber 12 gradually decreases while the concentration of the component B correspondingly increase and reaches, at the lower end of the wall 11, its highest value. Therefore, the component B can be withdrawn at the bottom of chamber 12 as an end- or intermediate product (the withdrawal not being shown in FIG. 1), while the component A is withdrawn from the upper region of the permeate chamber 13.

By showing an interruption between the upper and the lower part of the permeation cell 10, reference is made to the fact that the length (i.e. the vertical size as viewed in FIG. 1) of the wall 11 can be arbitrarily selected to meet particular operational requirements.

Figure 2:
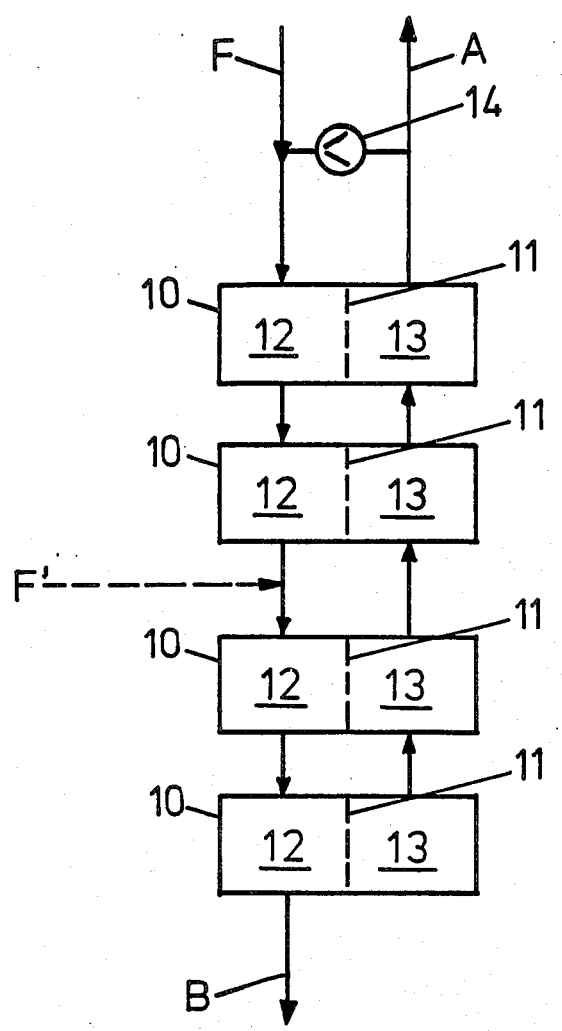
FIG. 2 is a diagrammatic representation of a first embodiment of apparatus according to the invention.

In the apparatus shown in FIG. 2, the overall required exchange- or wall surface is divided into four permeation stages coincident with four cells 10. All inlet chambers 12 of the permeation cells 10 are connected in series in one direction and the permeate chambers 13 are connected in series in the opposite direction, so that a corresponding circulation of the treated fluid F results. It can be seen already from this embodiment that the apparatus suitable for carrying out the method can be produced by way of a modular assembly.

In this case, the fluid F to be treated is charged directly to the pressure side of the feeding organ or pump 14, while one end product A is withdrawn at the suction side of the pump 14 from the last one of the series of the permeate chambers 13. The other end product B is withdrawn at the last one of the series of the inlet chambers 12.

Alternatively, however, as is shown by the broken arrow F', it is possible to charge the fluid at such point of the series of the inlet portions 12, at which the concentration of the fluid components in circulation generally corresponds to the respective concentration in the yet untreated fluid F'. The concentration balance of the fluid in circulation is thus distorted as little as possible by the addition of this further volume of the untreated fluid. Thus smaller exchange surfaces and a reduced volume of the circulated fluid are required to obtain a predetermined separation capacity.

Figure 3:
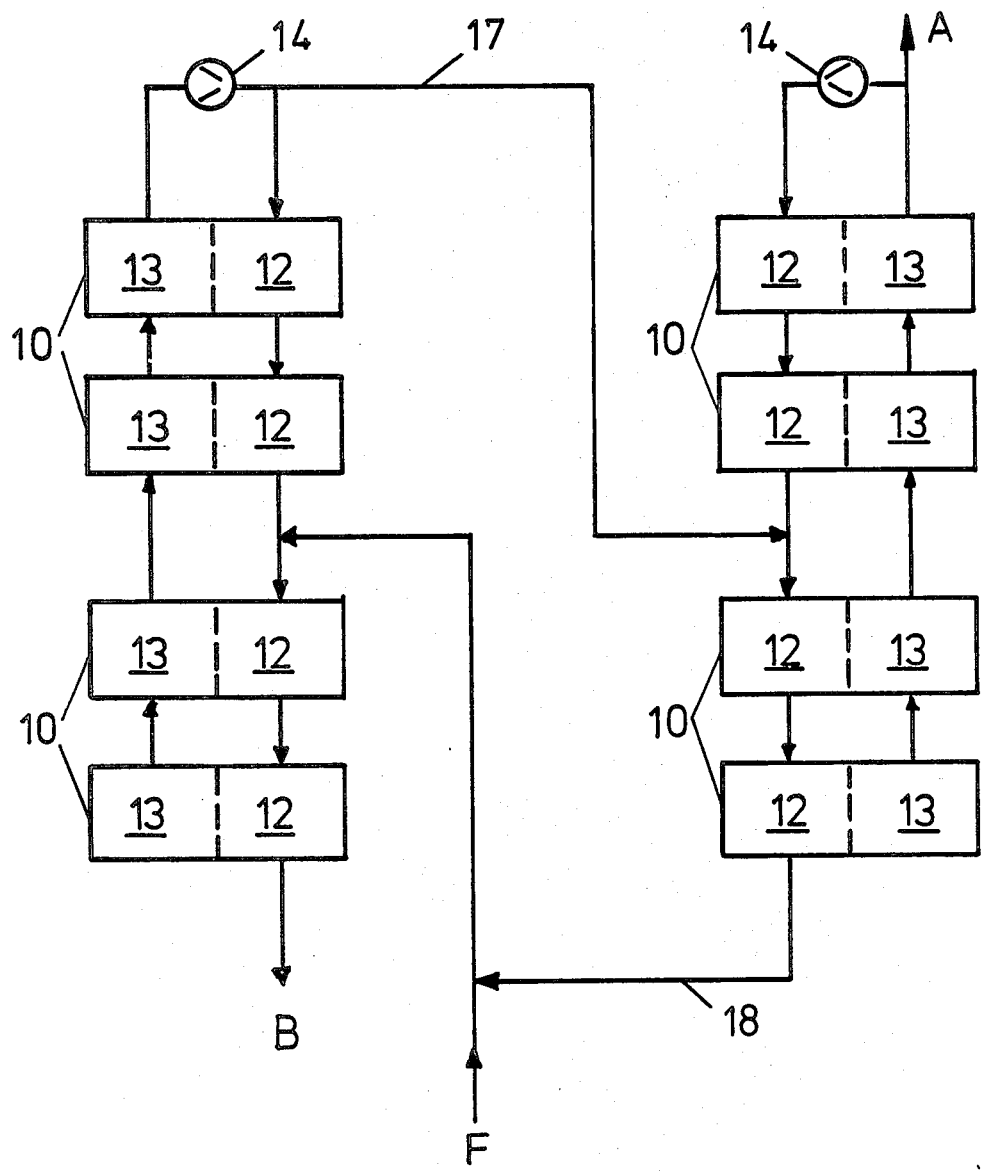
FIG. 3 is a view similar to that of FIG. 2 of a second embodiment of apparatus according to the invention.

In FIG. 3 is shown an apparatus which is composed of two sections 15 and 16. Each of the sections corresponds in its basic arrangement to the apparatus shown in FIG. 2 in that each section 15 or 16 is provided with four permeation cells 10 and with a pump 14, respectively.

The fluid to be separated is introduced in the first section 15 into the series of its inlet chambers 12 at a point at which the concentration differences of the components in the circulated fluid and in the untreated incoming fluid are as small as possible. The fluid withdrawn by the pump 14 from the cell 10 having the last one of the series of the permeate chambers 13 is partly charged back into the first or top inlet chamber 12 of the small cell 10, while another part of the withdrawn fluid is introduced over a conduit 17 into the series of inlet chambers 12 of the second section 16, at a point at which the components A and B of the fluid circulated in section 16 are each of generally the same concentration as in the fluid flow coming from the conduit 17.

By a conduit 18, a fluid flow component is withdrawn at the end of the series of the inlet chambers 12 of the section 16 and is charged back into the series of inlet chambers 12 of the first section 15 at the same location at which the untreated fluid enters. Alternatively it is naturally also conceivable to connect the discharge end of conduit 18 in the region of the inlet chamber series of section 15 at another point, as may be suitable from the standpoint of concentration of the components A and B in the fluid components in the conduit 18 vis-a-vis the composition of fluid circulated in section 15 for assuring as a small difference in concentration at the inlet point as possible.

Thus, in the devices described in FIGS. 2 and 3, a fluid is charged into the device having a component A possessing a better permeating property and a component B which permeates less readily. In the apparatus according to FIG. 2, the obtained end product enriched in the component A is withdrawn at the end of the series comprised of the individual permeate chambers 13 or at the suction side of the fluid mover or pump 14, while the end product enriched in the component B is removed at the end of the series of the inlet chambers 12.

With reference to the withdrawal of the end product enriched in component B, the arrangement in FIGS. 2 and 3 is the same. However in the embodiment of FIG. 3 the end product enriched in the component A is withdrawn from the second section 16, namely again at the end of the series formed by the respective permeate chambers 13.

The following example illustrates the operation of the apparatus shown in FIG. 2.

It is an object to separate $CO_2$ from air. In the method, 10 mol/h of air with 0.1 mol components of $CO_2$ are to be separated such that 90% $CO_2$ and air with a 1% $CO_2$ residue are obtained.

The corresponding calculations reveal that a total exchange surface of 5.98 $m^2$ is required. The compression flow required for the fluid circulation amounts to 336 mol/h. Only one fluid mover is required.

If the same problem is to be solved with a known recycling cascade arrangement, a total exchange surface of 7.62 $m^2$ is necessary. Thus, the surface requirement is already notably greater than in the use of a device according to FIG. 2. In the known device, admittedly, the required compression flow is only 87.2 mol/h. However, a total of 10 fluid movers is required so that the total technical demand of the arrangement in FIG. 2 is considerably lower.

If a device according to FIG. 3 is used to solve the same problem, then further considerable improvements are achieved. Two fluid movers or compressors are admittedly required. However, the total compression flow is only 80 mol/h while the required exchange surface is only 2.26 $m^2$. Thus, the exchange surface is smaller by 70.3% compared with the use of the device according to FIG. 2.

In both cases, $CO_2$ corresponds to the more readily permeating component A. Thus, the desired concentration is removed at the point marked with A.

On the other hand, the less readily permeating components of the air, particularly nitrogen and oxygen, correspond to the component of the fluid marked with B. Thus, air free of $CO_2$ will be withdrawn at the point marked B.

Figure 4:
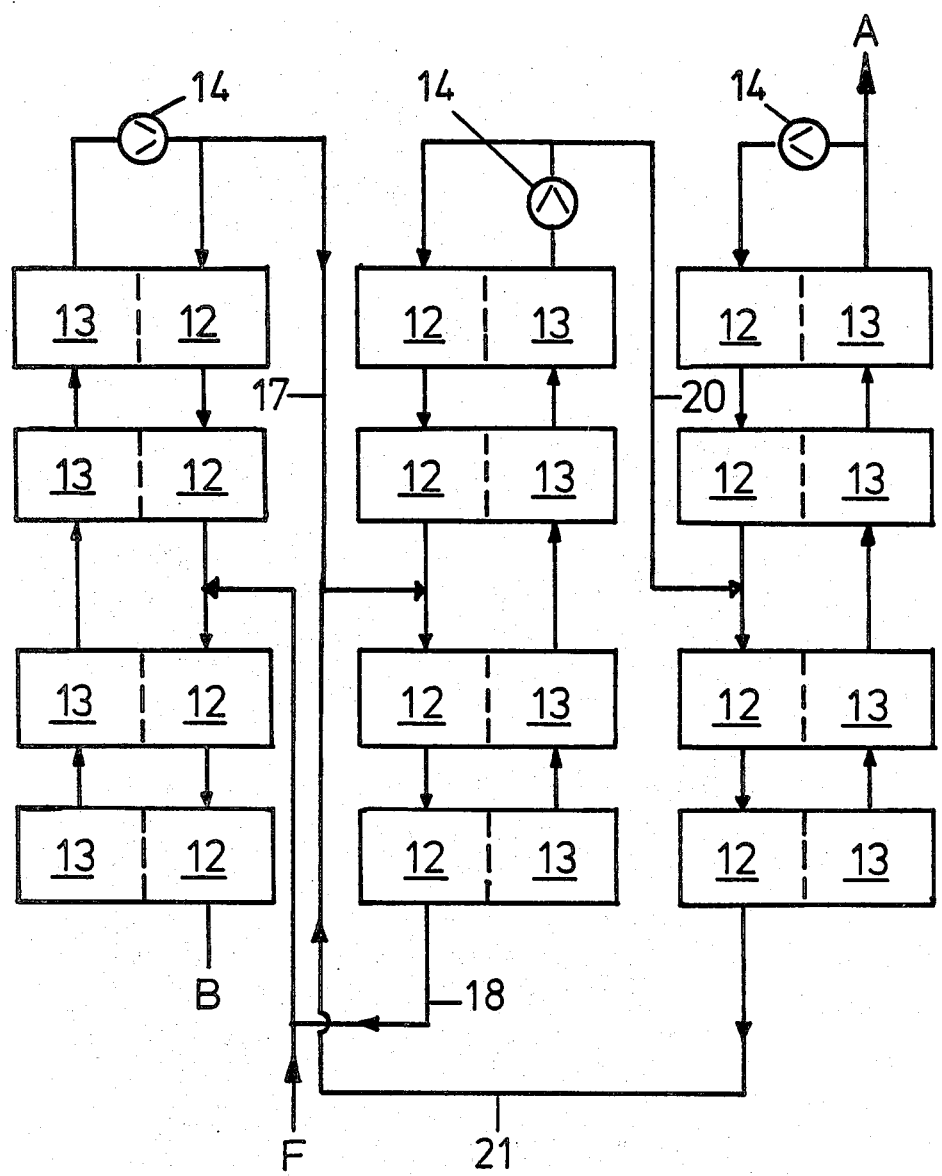
FIG. 4 is a view similar to that of FIG. 2 of a third embodiment of apparatus according to the invention.

A further modification of the apparatus according to FIG. 3 is shown in FIG. 4. Here, an auxiliary third section 19 is shown whose arrangement corresponds to that of the sections 15 and 16. A comparison with the apparatus of FIG. 3 reveals the following:

The fluid withdrawn from the permeate chambers 13 of the second section 16 is partly introduced, over a further conduit 20, into the series composed of the inlet chambers 12 of the third section 19, again at a point at which the concentration of components of the incoming fluid flow corresponds to the concentration which is present at the inlet point of section 19. The end of the series formed by the inlet chambers 12 of the section 19 is connected, over a conduit 21, with the conduit 17 through which is conveyed a fluid flow component from the first section 15 to the second section 16. The concentration of fluid components withdrawn from the third section 19 over the conduit 21 is so determined that an as small as possible difference in the concentration of the corresponding components is present at the inlet point of the second section 16.

The end product correspondingly enriched in $CO_2$ in accordance with the problem is withdrawn at a point marked with A of the third section 19.

Despite an auxiliary use of a third fluid mover, a further reduction of the required expenses is attained when the enrichment limits given by the problem are considered as parameters.

Figure 5:
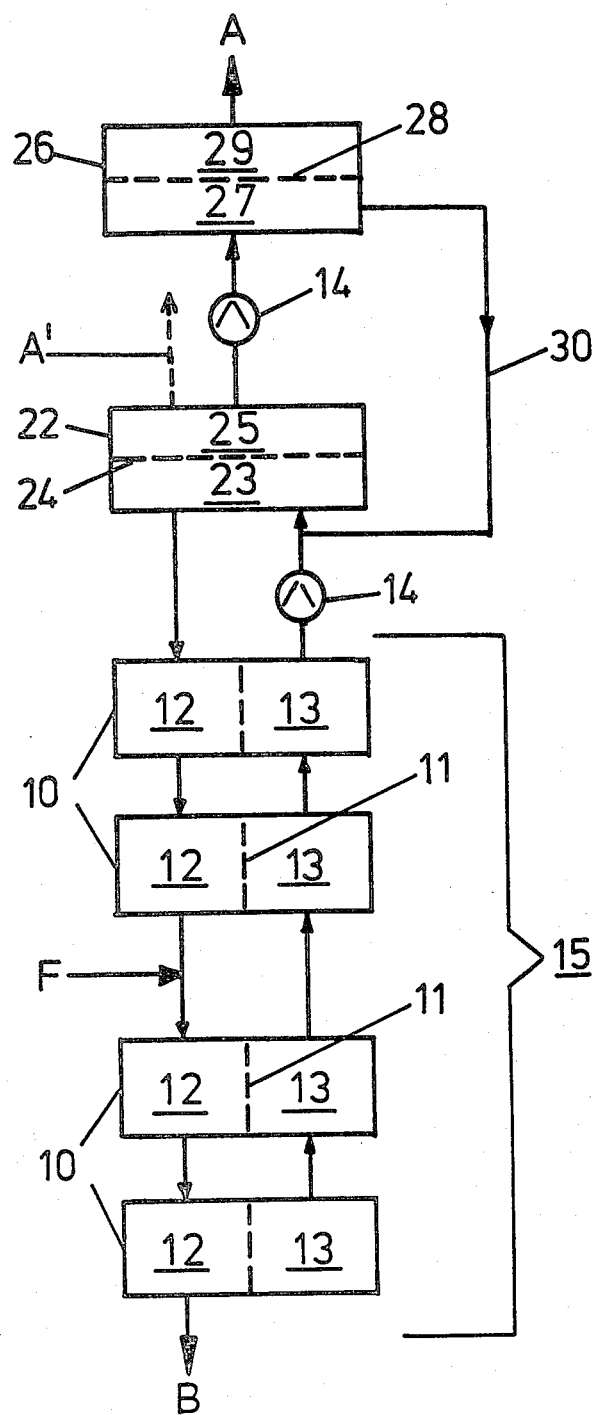
FIG. 5 is a view similar to that of FIG. 2 of a fourth embodiment of apparatus according to the invention.

FIG. 5 shows a further variation of an apparatus suitable for the carrying out of the proposed method. This one has section 15 of the layout corresponding to FIG. 3. The permeate withdrawn from the series of permeate chambers 13 by means of the fluid mover 14 is now first charged into a first auxiliary stage or cell 22, namely to an inlet chamber 23 of the same. From there on, the corresponding fluid flow is directed to the series of inlet chambers 12 of the section 15. The more readily permeating component A passes through a permeable wall 24 of the auxiliary cell 22 and, in a first alternative can be withdrawn as an end product, already from the permeate chamber 25 of the auxiliary cell 22 as indicated by a broken arrow line A'. In this case, the permeate chamber 25 of the auxiliary cell 22 does not form a part of the fluid circulation as is typical for the permeation stages used in the known cascade arrangements. However, it has been found out that the use of such an additional permeation stage is of advantage in the region of higher concentration of the more readily permeating phase as a reduction of the required exchange area results. This is the case particularly when the permeate chamber 25 of the first auxiliary stage 22 is connected, over a further fluid mover 14, with a second auxiliary cell 26 corresponding in its structure to the auxiliary cell 22 and provided with a permeable wall 28 and a permeate chamber 29. The fluid flow induced in the inlet chamber 27 of the second auxiliary cell 26 can be charged back, over a conduit 30, to the inlet side of the inlet chamber 23 of the first auxiliary cell 22. Even though such a feedback may be provided within the framework of the foregoing example it is not absolutely necessary. It is to be established, by tests in a particular case extent to which such feedback can contribute to the achievement of further improvements.

In the above described example, the component A enriched in $CO_2$ is withdrawn from the permeate chamber 29 of the second auxiliary cell 26 which, like the permeate chamber 25 of the first auxiliary cell, is not included in a circulation.

In the last mentioned embodiment, it is within the framework of the above problem that, for the given $CO_2$-concentration, only two fluid movers 14 or compressors are required. The compression flow is set at 49.1 mol/h, while the required exchange area amounts to only 1.9 $m^2$.

Figure 6:
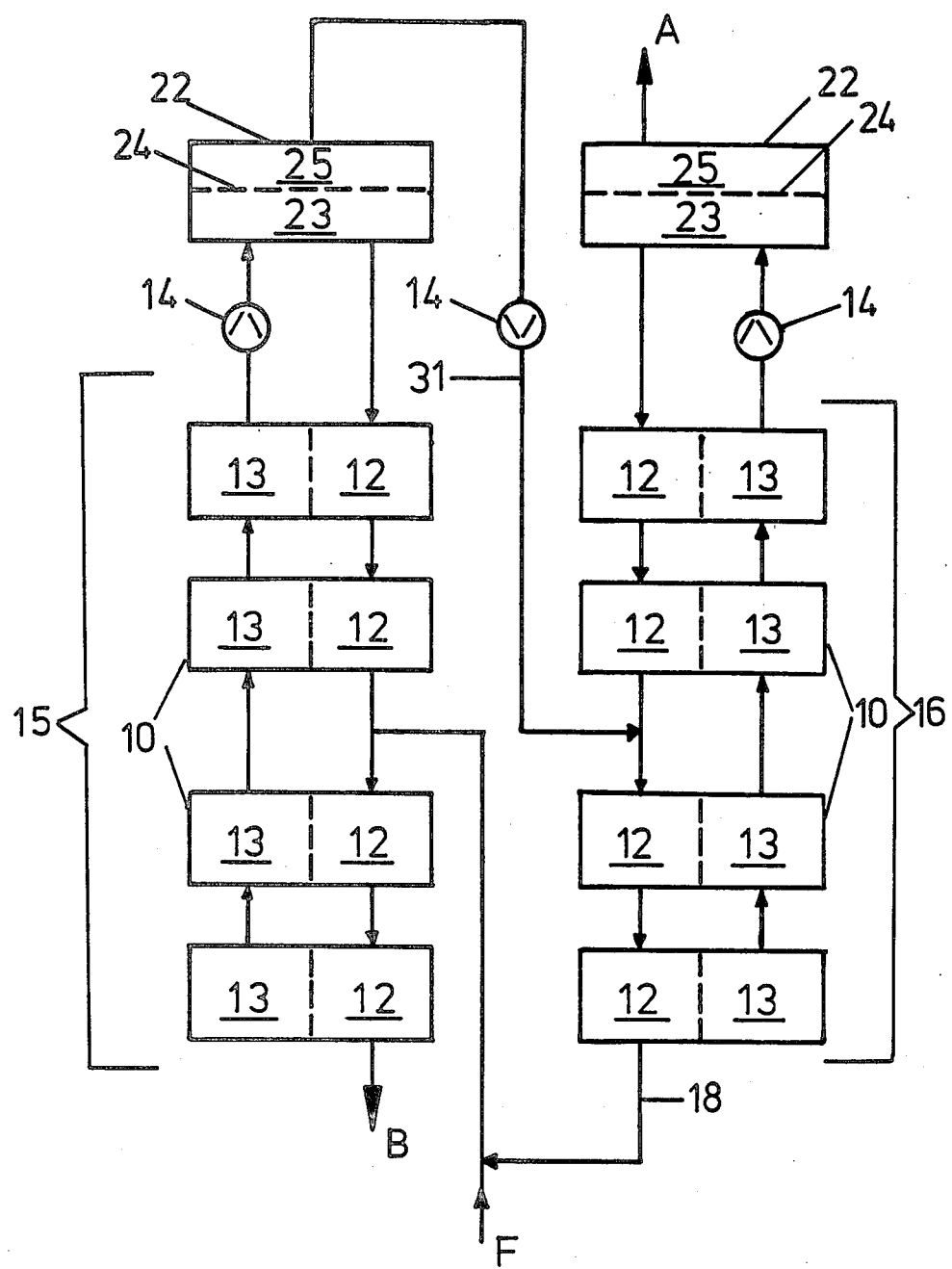
FIG. 6 is a view similar to that of FIG. 2 of a fifth embodiment of apparatus according to the invention.

A further embodiment of the inventive apparatus is shown in FIG. 6. Two sections 15 and 16 are provided, which are of the same structural arrangement as the respective sections of the previously described devices. Associated with each section 15 and 16 is a respective first auxiliary cell 22, namely in the same way as has been described for the first alternative according to FIG. 5 involving use of only one auxiliary cell. From the permeate chamber 25 of the auxiliary cell 22 which is connected downstream of the section 15, the permeate is removed. It arrives, over a further fluid mover 14 and a conduit 31, to the second section 16 where it is introduced into the series of the inlet chambers 12 at a point at which the concentration differences of the components are as low as possible. The downstream end of the series formed by the inlet chambers 12 of the section 16 is further connected, as in the embodiment of FIG. 3, over a conduit 18, with the first section 15, so that the removed less readily permeating component is introduced into the series formed by inlet chambers 12 of the first section 15, namely at the same point at which the introduction of untreated fluid takes place. The correspondingly enriched $CO_2$ or the component A is withdrawn from the permeate chamber 25 of the auxiliary cell 22 at the end of the second section 16.

In use of an apparatus thus structured a compression flow of 43.9 mol/h is obtained within the framework of the above problem, at an exchange surface of merely 1.78 $m^2$, wherein three fluid movers 14 or compressors are required for the circulation of the fluid.

Figure 7:
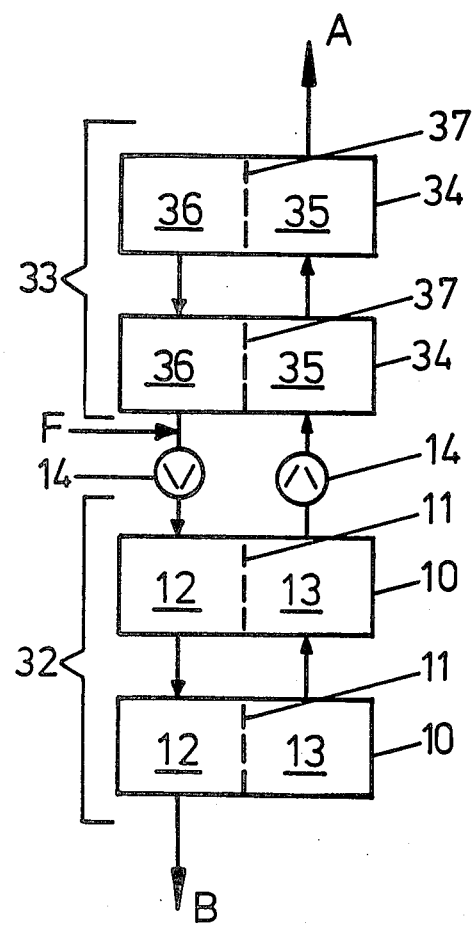
FIG. 7 is a view similar to that of FIG. 2 of a sixth embodiment of apparatus according to the invention.

A further embodiment is shown in FIG. 7. A first section 32 contains two permeation cells 10, each with an inlet chamber 12, a permeate chamber 13 and a wall 11, which, similarly to all of the above described examples, is more readily permeable by the component A of the treated fluid flow.

A second section 33 has two permeation cells 34, each of which is provided with an inlet chamber 35, a permeate chamber 36 and with a permeable wall 37. The latter is so arranged, contrary to the wall 11, that it is more readily permeable by the component B.

In this case, the circulation is so arranged that the permeate chambers 13 of the permeation cells 10 of the first section 32, one fluid mover 14, and the inlet chambers 35 of the permeation cells 34 of the second apparatus section 33 are interconnected in series. Similarly, a series is formed from the permeate chambers 36 of the permeation cells 34, from a further fluid mover 14 and from the inlet chambers 12 of the permeation cells 10 in the first section 32. In detail, the following operation is then obtained.

The inlet of the untreated fluid flow composed of components A and B takes place in the region of the last mentioned series between the last permeate chamber 36 and the fluid mover 14. The component A permeates in both permeation stages 10 from the inlet chambers 12 into the permeate chambers 13 and passes from same over one of the fluid movers 14 into the inlet chambers 35 of the two permeation cells 34. On entry into the first inlet chamber 35, the fluid is already enriched to a substantial percentage in the component A; however, it still contains the component B. Since the partitions 37 of the permeation cells 34 are more readily permeable by the component B, the component B passes in both such permeation stages 34 into the permeate chambers 36, whereby the concentration of the component A in the inlet chambers 35 is further increased. The component A is then withdrawn as an end product at the end of the series formed from the two inlet chambers 35.

From both permeate chambers 36 of the permeation cells 34 forming the section 33, the fluid containing a large B component is directed, over the fluid mover 14, into the inlet chambers 12 of the permeation cells 10, from which, again, the component A can exit through the permeable walls 11. At the end of the series formed from the two inlet chambers 12, it is thus possible to withdraw the component B at its higher concentration.

With the method proposed by the invention, a number of separation problems can be solved. In the following, individual examples of applicability of the method are referred to both in the field of gas permeation as well as liquid permeation.

The following systems can be referred to as examples for the technical separation method taking place under permeation in gaseous phase:
separation of He, $H_2$, $O_2$, $CO_2$, $SO_2$, $NH_3$ from gaseous mixtures;
separation of saturated and unsaturated hydrocarbons;
purification of contaminated air or of exhaust gas;
$CH_4$-enrichment in $N_2$ containing gases;
separation of nuclear fission gases;
separation of isotopes;
$O_2$ enrichment of air;
separation of $H_2$ from contaminated air;
removal of $CO_2$ from interior air.

The areas of application in the liquid permeation field are, for instance:
water separation from organic mixtures and vice versa;
separation of isomeric, azeotropic, thermally unstable mixtures, narrow boiling mixtures;
waste water purification.

Besides, valuable organic and inorganic components can be recovered or concentrated, for instance from water or the like carrier fluids (pharmaceutics).

Similarly to gas- or gel chromatography, a mixture can be quantitatively separated by the inventive method so that the method can also be used in testing techniques.

As is apparent from the foregoing description of the particular embodiments, numerous variations of the proposed method or of the corresponding layout of the apparatus are possible within the framework of the invention. In a particular case, naturally, for each separation problem respective technical and economic optimum values must be determined. This applies particularly with regard to the respective suitable or useful number of the feeding organs or compressors, as well as the magnitude of the particular compression flows and the overall exchange surface. Therefore, many further modifications of the aforesaid examples of the inventive method and apparatus exist which do not depart from the scope of the accompanying claims.

We claim:

1. A method for the separation of a fluid containing at least first and second components by permeation in two permeation stages each provided with a wall which is differently permeable by the fluid or its components and which divides its associated stage into an inlet portion and a permeate portion, with the walls of the two stages having respectively different permeability properties, such that the walls of one of the two stages are more readily permeable by the first component than by the second component of the fluid and the walls of the other of the two stages are more readily permeable by the second component than by the first component of the fluid, the permeate portion of one permeation stage being connected, over a fluid mover device, with the inlet portion of the other permeation stage, and the permeate portion of the other permeation stage being connected, over a further fluid mover means, with the inlet portion of the one permeation stage, and the respective product flows being each withdrawn at the respective ends of the respective inlet portions.

2. Apparatus for separation of at least two components of a fluid from each other, comprising, in combination, two permeation sections each permeation section comprising:
   (a) a plurality of permeation cells disposed one after the other and comprising a first cell and a last cell;
   (b) each cell comprising a container subdivided by a permeable wall into an inlet chamber and permeate chamber, said wall being of a predetermined permeability with respect to said at least two components;
   (c) said inlet chambers being interconnected in series for fluid passage in a direction from said first cell to said last cell;
   (d) said permeate chambers being interconnected in series for fluid passage in a direction from said last cell to said first cell;
   (e) first discharge means for discharging fluid from the permeate chamber of the first cell;
   (f) second discharge means for discharging fluid from the inlet chamber of the last cell;
   (g) feeding means communicating with said series of the inlet chambers for feeding fluid into said series of the inlet chambers at a predetermined location thereof;
   (h) feedback means including fluid mover means and communicating the permeate chamber of the first cell with said series of the inlet chambers for feeding a part of the fluid from the permeate chamber to a predetermined location of said series, wherein said first discharge means of one said section is connected for delivering the fluid not fed to said series of inlet chambers of said one section to said series of inlet chambers of the other said section, and said second discharge means of said other section is connected for delivering the fluid removed from said series of inlet chambers of said other section to said feeding means of said one section.

3. Apparatus as claimed in claim 2, wherein said predetermined location of said series at which the feedback means communicates with said series of the inlet chambers is generally coincident with the inlet chamber of the first cell.

4. Apparatus as claimed in claim 2, wherein the predetermined location at which said feeding means communicates with said series of the inlet chambers is disposed downstream of the inlet chamber of the first cell and upstream of the inlet chamber of the last cell.

5. Apparatus as claimed in claim 2, 3 or 4, wherein each said section comprises a row of cells, said sections being connected one after the other, said feeding means of one section serving for feeding untreated fluid to the inlet chamber series of said one section.

6. In a method for separating a fluid by permeation in at least two permeation sections, which are first and second permeation sections, each section being composed of at least one permeation stage which is provided with a wall differently permeable for the fluid or its components, each stage being divided by the wall into an inlet portion and a permeate portion, according to which method fluid to be separated is introduced into the inlet portion of a stage of the first section to flow along the wall of that stage while a more readily permeating component of the fluid passes through the wall and into the permeate portion of that stage, and fluid in the permeate portion of that stage flows along the wall in countercurrent to the fluid in the inlet portion of that stage, fluid is withdrawn, as permeate, from the permeate portion of a stage of the first permeation section in the vicinity of one end of the wall of that stage so that all fluid withdrawn, as permeate, from the first section is withdrawn from one stage thereof, a first part of the permeate thus withdrawn is returned to the inlet portion of the same stage in the vicinity of the one end of the wall, and a second part of the permeate thus withdrawn is conducted away from the first section, the improvement comprising: conducting the second part of the permeate into the inlet portion of a stage of the second permeation section to flow along the wall of that stage while a more readily permeating component thereof passes through the wall and into the permeate portion of that stage of the second permeation section; causing fluid in the permeate portion of that stage of the second permeation section to flow along the wall of that stage in countercurrent to the fluid in the inlet portion of that stage; withdrawing fluid, as permeate, from the permeate portion of a stage of the second section so that all fluid withdrawn, as permeate, from the second section is withdrawn from one stage thereof; returning a first part of the permeate thus withdrawn from the permeate portion of the one stage of the second permeation section to the inlet portion of the same stage of the second permeation section by means of a circulating device; and conducting a second part of the permeate thus withdrawn from the permeate portion of the one stage of the second permeation section away from the second permeation section.

7. A method according to claim 6, wherein a plurality of permeation stages is provided in each section the inlet portions and the permeate portions of which are operated in series, respectively.

8. A method according to claim 7, wherein the fluid to be treated is charged to that place in the series of the portions of the permeation stages of each section at which the concentration of the circulated fluid generally corresponds to the concentration of the components in the fluid to be treated.

9. A method according to claim 6, 7 or 8, wherein each section is composed of a number of permeation stages arranged in series, and so interconnected with each other that a first fluid flow portion not circulated back to the inlet portion of one permeation stage in the first section is charged to that location of the series of inlet portions of the second section at which the concentration of the fluid circulated in the second section generally corresponds to the concentration of the components contained in the first fluid flow portion.

10. A method according to claim 9, characterized in that a second fluid flow portion withdrawn at the inlet portions of the second section is charged into the series of the inlet portions of the first section at which the concentration of the fluid circulated in the first section generally corresponds to the concentration of the components contained in the second fluid flow portion.

11. A method according to claim 6, 7 or 8, wherein the fluid flow withdrawn from the permeate portion of the one stage of the first section is at least partially circulated over an inlet portion of an auxiliary permeation stage into the inlet portion of the same permeation stage, the permeate obtained in the auxiliary stage is fed into the inlet portion of one permeation stage of the second section, and the less permeating component withdrawn from the last mentioned inlet portion is circulated into the inlet portion of a stage of the first section.

12. A method according to claim 6, 7 or 8 wherein the withdrawal of fluid, as permeate, from the permeate portion of the one stage of the first permeation section, the return of the first part of the permeate and the conducting away of the second part of the permeate are carried out by conducting the permeate from the permeate portion of that stage of the first permeation section to the inlet portion of an auxiliary permeation stage which has a permeate portion separated from its inlet portion by a wall differently permeable for the fluid or its components, conducting fluid, as the first part of the permeate, from the inlet portion of the auxiliary stage to the inlet portion of the stage of the first permeation section, and conducting away fluid, as the second part of the permeate, from the permeate portion of the auxiliary stage.

13. A method according to claim 12, wherein the permeate portion of the auxiliary permeation stage is connected with the inlet portion of a second auxiliary permeation stage and that an end product is withdrawn from the permeate portion of the second auxiliary permeation stage.

14. A method according to claim 6, wherein each permeation section is, formed by a number of permeation stages, and permeable walls comprised in the respective permeation stages have different permeability properties such that a stronger permeability is provided for different respective components of the fluid.

15. In a method for separating a fluid by permeation in at least three permeation sections, which are first, second and third permeation sections, each section being composed of at least one permeation stage which is provided with a wall differently permeable for the fluid or its components, each stage being divided by the wall into an inlet portion and a permeate portion, according to which method fluid to be separated is introduced into the inlet portion of a stage of the first section to flow along the wall of that stage while a more readily permeating component of the fluid passes through the wall and into the permeate portion of that stage, and fluid in the permeate portion of that stage flows along the wall in countercurrent to the fluid in the inlet portion of that stage, and fluid is withdrawn, as permeate, from the permeate portion of a stage of the first section, the improvement wherein the first section is composed of at least two such permeation stages, which are first and second permeation stages, the fluid to be separated is introduced into the inlet portion of the first stage of the first section, fluid in the permeate portion of the first stage of the first section is conducted to the permeate portion of the second stage of the first section, and the fluid withdrawn, as permeate, from the permeate portion of a stage of the first section is withdrawn from the permeate portion of the second stage of that section, and wherein said method comprises: conducting the permeate withdrawn from the second stage of the first section to the inlet portion of a stage of the second permeation section to flow along a wall of that stage while a more readily permeating component thereof passes through the wall and into the permeate portion of the stage of the second permeation section; conducting fluid from the inlet portion of the stage of the second permeation section to the inlet portion of the second stage of the first permeation section and from the inlet portion of the second stage of the first section to the inlet portion of the first stage of the first section; withdrawing fluid from the permeate portion of the stage of the second permeation section and conducting that fluid to the inlet portion of the stage of the third permeation section to flow along the wall of that stage while a more readily permeating portion thereof passes through the wall and into the permeate portion of that stage of the third permeation section; withdrawing fluid from the permeate portion of the stage of the third permeation section; and conducting fluid from the inlet portion of the stage of the third permeation section to the inlet portion of the stage of the second permeation section.

* * * * *